United States Patent [19]

Baron

[11] Patent Number: 4,506,703
[45] Date of Patent: Mar. 26, 1985

[54] FOUR-WAY FLUID FLOW DIVERTER VALVE

[75] Inventor: Walter J. Baron, Milwaukee, Wis.

[73] Assignee: Water Services of America, Inc., Milwaukee, Wis.

[21] Appl. No.: 475,203

[22] Filed: Mar. 14, 1983

[51] Int. Cl.³ .................. F16K 11/02; F16K 11/07
[52] U.S. Cl. .................................................. 137/625.43
[58] Field of Search ................ 137/625.43, 625.44, 137/625.46, 625.47; 251/306, 182, 161, 160, 187, 180, 181

[56] References Cited

U.S. PATENT DOCUMENTS

| | | |
|---|---|---|
| 644,280 | 2/1900 | Coyne . |
| 813,771 | 2/1906 | Bush ..................................... 251/306 |
| 1,958,262 | 5/1934 | Boland . |
| 2,251,320 | 8/1941 | Brisbane ................................. 251/56 |
| 2,296,568 | 9/1942 | Peacock . |
| 3,319,710 | 5/1967 | Heeren et al. . |
| 3,973,592 | 8/1976 | Cleaver et al. . |
| 4,286,625 | 9/1981 | Tomlin et al. . |

FOREIGN PATENT DOCUMENTS 832819 2/1952 Fed. Rep. of Germany .

Primary Examiner—Martin P. Schwadron
Assistant Examiner—John S. Starsiak, Jr.
Attorney, Agent, or Firm—Andrus, Sceales, Starke & Sawall

[57] ABSTRACT

A four-way diverter valve has a cylindrical housing wall (10) and two pair of in-line ports (16-19) for connection to a heat exchanger condenser (3). A diverter element (20) is mounted for rotation on a transverse axis (25). The diverter element has a baffle (22) which forms fluid flow passages (23, 24). Radial ribs (35, 36) are disposed on the outer wall of the diverter element. End closure plates (11, 13) for the valve have a first stop device (37, 40) for engagement by the ribs for properly positioning the diverter element in a normal position. A second stop means (43) is provided for rib engagement to position the diverter element in rotated position when the fluid flow downstream of the valve is to be reversed. Diagonally opposed ports (18, 17) are surrounded by concave seats (44, 45) which are inclined at an acute angle to the cylindrical housing wall. The end edges (51) of the diverter element wall and baffle ends (52) are slanted transversely. An axle (26, 27) mounts the tubular diverter element for rotation about its axis. A device (53-59) is provided to shift the axle axially when desired. Resilient seals (39, 42) are provided in association with the longitudinal ribs and stops.

7 Claims, 10 Drawing Figures

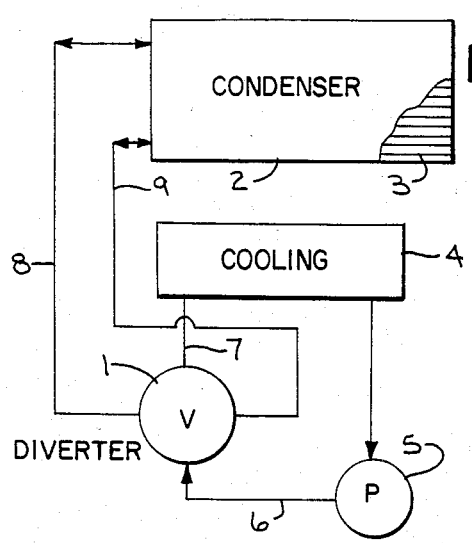
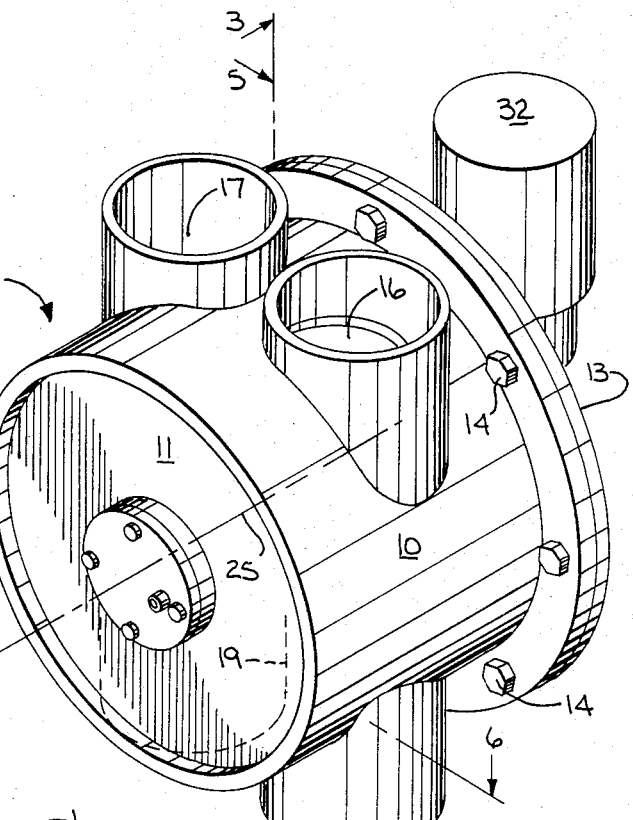
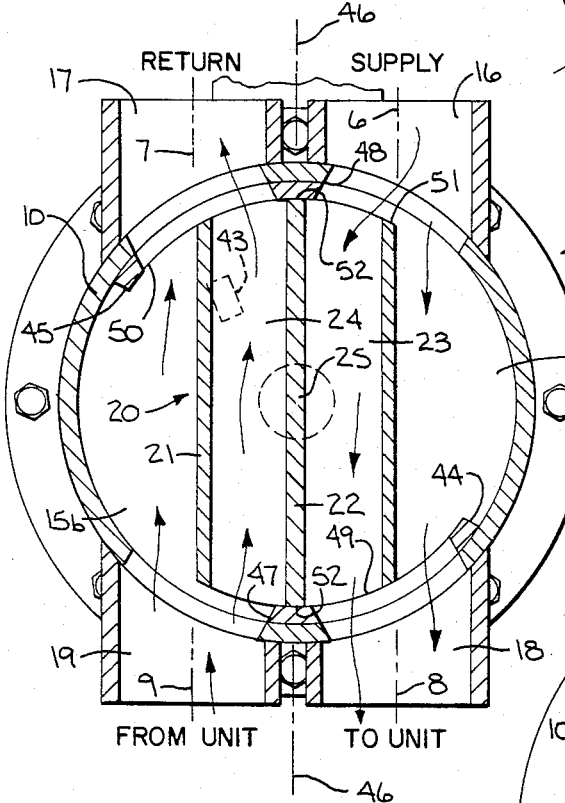
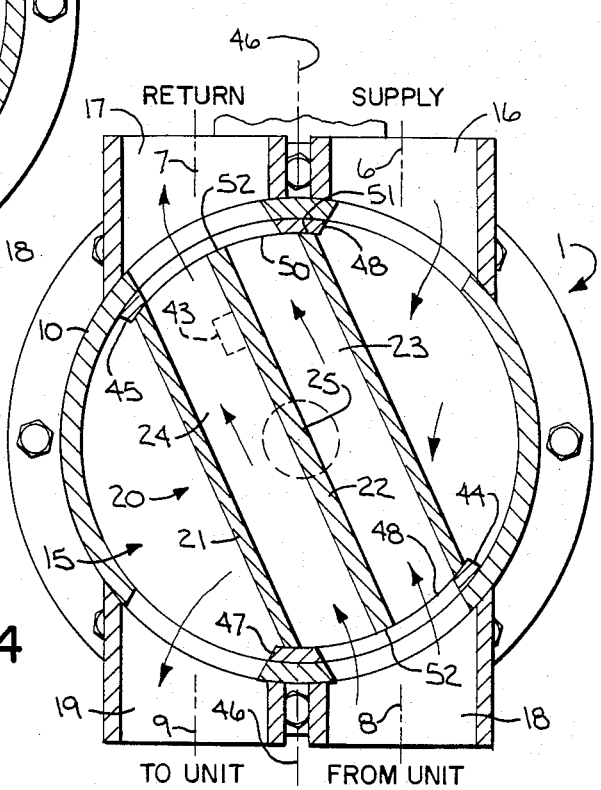

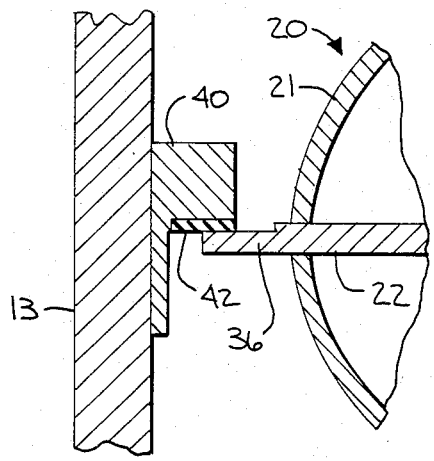
FIG. 7
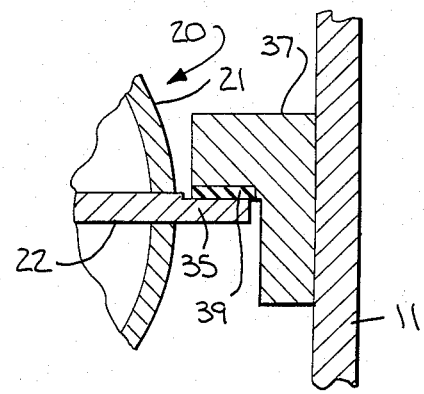
FIG. 8
FIG. 9
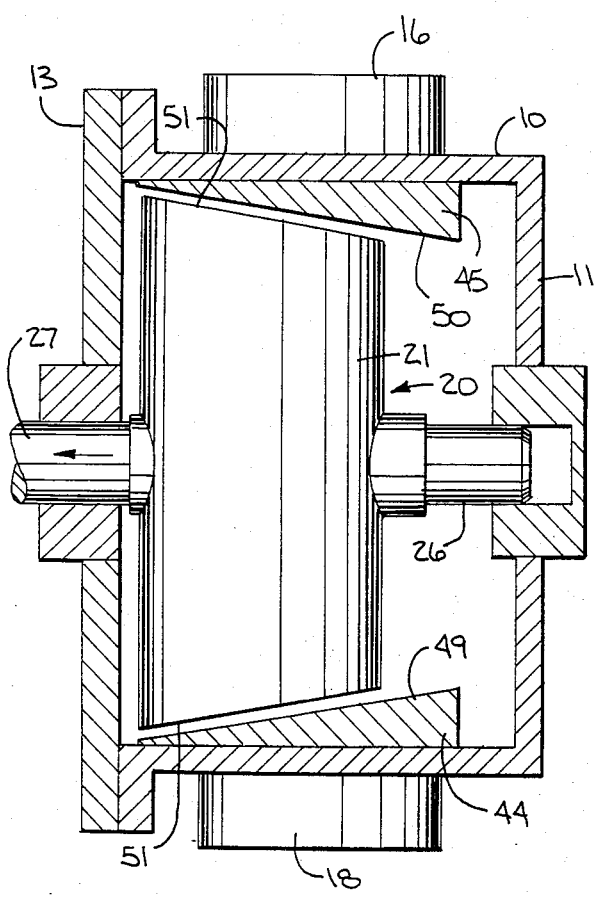
FIG. 10
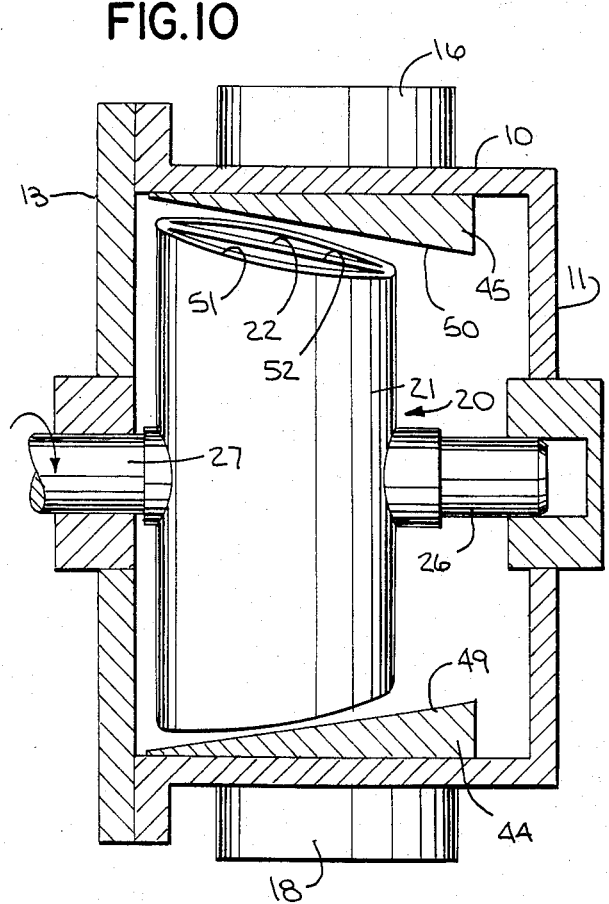

FOUR-WAY FLUID FLOW DIVERTER VALVE

U.S. PRIOR ART OF INTEREST

Coyne U.S. Pat. No. 644,280—Feb. 27, 1900 (Issued); Boland U.S. Pat. No. 1,958,262—May 8, 1934 (Issued); Peacock U.S. Pat. No. 2,296,568—Sept. 22, 1942 (Issued); Heeren et al. U.S. Pat. No. 3,319,710—May 16, 1967 (Issued); Cleaver et al. U.S. Pat. No. 3,973,592—Aug. 10, 1976 (Issued); Tomlin et al. U.S. Pat. No. 4,286,625—Sept. 1, 1981 (Issued).

BACKGROUND AND SUMMARY OF THE INVENTION

This invention relates to an improved fluid flow diverter valve, which is adapted especially for use in the cleaning of tubing of heat exchangers.

It has previously been suggested that heat exchanger tubing may be internally cleaned by mounting brush-basket assemblies on the ends of the tubes, and then by flowing fluid first in one direction and then the other to cause the brushes to traverse the length of the tubes and then return to their original position. See the above-identified U.S. Pat. No. 3,319,710.

It has also previously been suggested as in the above-identified U.S. Pat. No. 3,973,592 to utilize a four-way valve for purposes of reversing fluid flow within the tubes to cause the cleaning brushes to move in both directions within the tubes.

It is also known to provide a valve with a movable frusto-conical plug element or the like and wherein the outer wall of the plug element is normally seated in a frusto-conical seat, but wherein the said outer wall of the plug may be lifted from its seat and turned during valve actuation. See, for example, the above-identified U.S. Pat. No. 4,286,625.

The present inventor is also aware of a recently developed four-way diverter valve construction having a cylindrical housing wall and two pair of in-line ports for connection to a heat exchanger condenser or the like. Disposed within the interior of the valve housing is a longitudinal hollow tubular fluid flow diverter element mounted for rotation on a transverse axis coinciding with the center axis of the cylindrical wall. The tubular diverter element is provided with an inner generally diametrical baffle which forms separate but parallel fluid flow passages therein. Diametrically opposed longitudinally extending radial ribs are disposed on the outer wall of the tubular diverter element and directly in line with the edges of the inner baffle. The end closure plates for the valve are provided with a first stop device for engagement by the diverter element ribs for properly positioning the diverter element in a normal position parallel to the in-line ports. A second stop means is provided for rib engagement to properly position the diverter element in rotated position when the fluid flow downstream of the valve is to be reversed.

Although the end edges of the tubular diverter element and the baffle have been machined to closely conform in curvature with the inner curvature of the cylindrical valve wall, and very close tolerances have been maintained therebetween and with the positioning stops, problems have arisen with the known valve.

When the tubular diverter element is in its normal position, fluid flows through the valve housing in a straight line between the upstream and downstream ports, with one flow being reversed from the other. The baffle of the tubular diverter element is intended to separate the oppositely flowing fluid. However, there is a fluid pressure drop between the supply and return side of the valve, and leakage or bypassing of fluid from the supply side to the return side has been observed, especially at the contacting interfaces of compound curvature between the end edges of the tubular diverter baffle and the inside cylindrical valve wall. Some bypass has also been observed in connection with the first stop means. The bypassing of fluid from the supply to the return side of the valve is highly undesirable because it lowers the efficiency of operation of the device downstream of the valve. Bypassing when the tubular diverter element is in its rotated position has also been observed.

In addition, it has been observed that when the tubular diverter element is rotated between positions, the end edges of the element tend to bind on the inner surface of the cylindrical wall as the edges slide thereacross. Machining the parts to less close tolerances could alleviate this problem, but the above-described bypassing would be undesirably increased even more.

It is a task or object of the present invention to improve the features and operation of the above-described valve known to the inventor. It is a further task to substantially decrease the bypassing of fluid between the supply and return sides of the valve. It is yet another task to substantially reduce or eliminate the problem of binding of the tubular diverter element to the cylindrical housing wall during rotation of the diverter element between positions. It is a further task to accomplish all of the above tasks in an economical manner.

In accordance with the various aspects of the invention, diagonally opposed ports in the valve housing are surrounded by concave seats which are inclined at an acute angle to the cylindrical housing wall and the axis of rotation of the tubular diverter element. The end edges of the diverter element wall and baffle ends are slanted transversely at substantially the same angle to provide an engageable planular interface, in section, between the parts. Each seat extends circumferentially toward the other adjacent port and is intersected by a central longitudinal plane containing the baffle of the tubular diverter element when the element is in its normal position so that the seat terminates on the side of the diverter element baffle remote from the surrounded port when the diverter element is in normal position.

An axle mounts the tubular diverter element for rotation about its axis. A device is provided to shift the axle axially when desired. Thus, the diverter element and its associated parts can be tightened onto the seats, but also when the diverter element is to be rotated from its normal to its second position, the end edges of the associated parts can be lifted from the circumferential tapered seats for free subsequent rotation.

Resilient seals are provided in association with the longitudinal ribs and stops. The seal is maintained during shifting of the diverter element along its axis.

BRIEF DESCRIPTION OF THE DRAWINGS

The accompanying drawings illustrate the best mode presently contemplated of carrying out the invention.

In the drawings:

FIG. 1 is a schematic showing of a heat exchange system to which the fluid flow diverter of the present invention may be applied;

FIG. 2 is a perspective view of a valve constructed in accordance with the concepts of the invention;

FIG. 3 is a vertical section taken on line 3—3 of FIG. 2 and showing the diverter element in normal position;

FIG. 4 is a view similar to FIG. 3 and showing the diverter element in fluid diverting position;

FIGS. 7 and 8 are detailed horizontal sectional views taken on their respective lines 7—7 and 8—8 of FIG. 5; and FIGS. 9 and 10 are schematic views showing the lift-and-turn positions of the diverter element in somewhat exaggerated form.

DESCRIPTION OF THE PREFERRED EMBODIMENT

Figure 5:
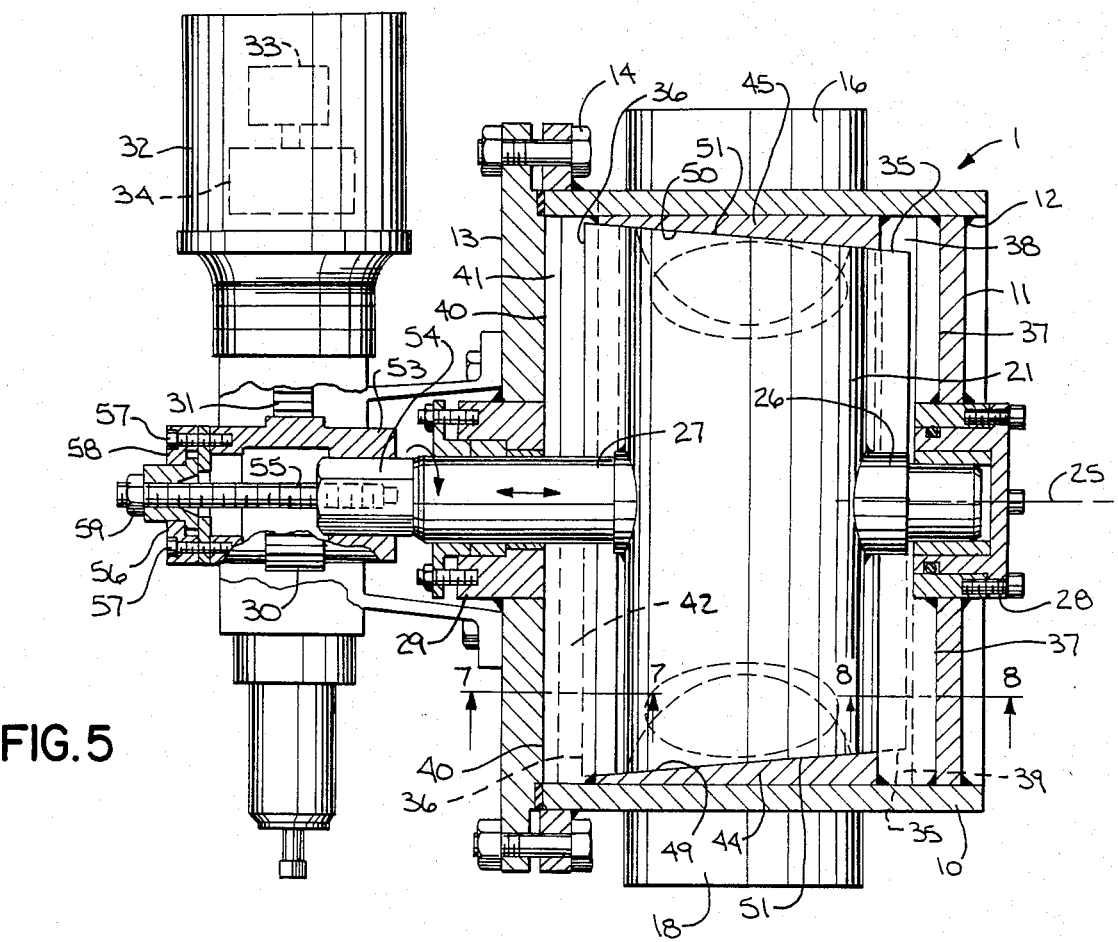
FIG. 5 is a vertical section taken on line 5—5 of FIG. 2 with the diverter element in normal position.
Figure 6:
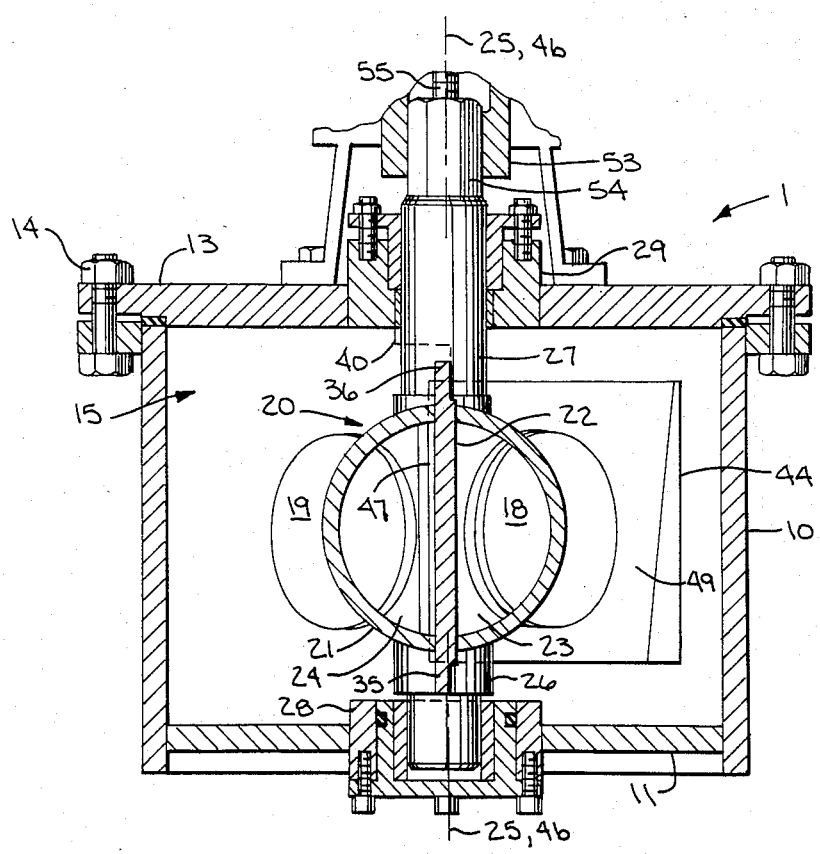
FIG. 6 is a horizontal section taken on line 6—6 of FIG. 2.

The fluid flow diverter valve 1 of the invention is shown schematically in FIG. 1 and may be utilized in connection with a process device such as a heat exchange condenser 2 having a plurality of tubes 3 therein. Diverter valve 1 normally supplies cooling water from a fluid source 4 such as a lake or the like and flow thereof is continuously generated by a pump 5. The diverter is connected to pump 5 and source 4 through a suitable fluid supply line 6, and also to source 4 by a suitable return line 7. A pair of lines 8 and 9 connect diverter valve 1 to condenser 2 in the conventional manner. Diverter valve 1 is actuatable to reverse the flow in lines 8 and 9 so that tube cleaning brushes, not shown, can shuttle back and forth in condenser tubes 3 from time to time.

Turning now to FIGS. 2-6, valve 1 is shown as having a housing including a cylindrical wall 10 closed at one end by a wall or plate 11 secured thereto as by welds 12, and closed at its other end by a wall or plate 13 secured thereto as by bolts 14. The construction forms an internal cylindrical valve chamber 15.

Cylindrical wall 10 is provided with a pair of spaced ports 16 and 17 which are upstream in the loop formed with source 4 and condenser 2 (see FIG. 1), and always function as supply and return ports respectively. Similarly, wall 10 includes a pair of spaced downstream ports 18 and 19 connected to lines 8 and 9 to condenser 2. As shown, the construction provides diametrically opposed in-line pairs of ports.

For purposes of diverting fluid flow through valve 1, an elongated longitudinal hollow tubular fluid flow diverter element 20 is dispensed within the valve housing. Diverter element 20 is open-ended and includes a cylindrical wall 21 and an inner generally diametrical imperforate baffle 22 which forms a pair of separate parallel fluid flow passages 23 and 24 therein.

Diverter element 20 is mounted for rotation between operative positions about a transverse axis 25 coinciding with the center axis of cylindrical housing wall 10. For this purpose, diverter element 20 is secured to a pair of stub axles 26 and 27 which are journalled in respective bearings 28 and 29 on respective plates 11 and 13. A pinion 30 is disposed on an outer extension of stub axle 27 and meshes with a rack 31 extending from an actuator 32 having the usual motor 33 and gear box 34 connected to the rack. Selective actuation of motor 33 thus causes diverter element 20 to rotate on axis 25 between a normal position parallel to the in-line ports, as in FIGS. 3, 5 and 6, and a rotated position, as in FIG. 4.

Referring especially to FIGS. 5, 7 and 8, stop means are provided to locate diverter element 20 in its normal position. For this purpose, diametrically opposed longitudinally extending radial ribs 35 and 36 are disposed on the outer surface of wall 21 of diverter element 20 and directly in line with and coextensive with the edges of baffle 22. Ribs 35 and 36 extend the full length of element 20 and are interrupted by the respective stub axles 26 and 27. An L-shaped elongated stop member 37 is disposed on the inner wall of plate 11 and extends parallel to the in-line ports and midway therebetween so that it intersects axis 25. The upper portion of stop member 37 above axis 25, as shown in FIG. 5, is provided with a forwardly facing resilient seal strip 38, while the lower portion of stop member 37 below axis 25, as shown in FIG. 5, is provided with an oppositely rearwardly facing resilient seal strip 39. Likewise, an L-shaped elongated stop member 40 is disposed on the inner wall of plate 13 and extends parallel to stop member 37 through axis 25. The upper portion of stop member 40 above axis 25, as shown in FIG. 5, is also provided with a forwardly facing resilient seal strip 41, while the lower portion of stop member 40 below axis 25, as shown in FIG. 5, is provided with an oppositely rearwardly facing resilient seal strip 42. Stops 37 and 40 and their respective seal strips extend the full distance between diametrically opposed portions of wall 10.

Referring again to FIG. 5, when diverter element 20 is rotated to its normal position, the portions of ribs 35 and 36 above axis 25 move rearwardly against the forwardly facing seals 38 and 41, while the portions of ribs 35 and 36 below axis 25 move forwardly against the rearwardly facing seals 39 and 42. Stop members 37 and 40 not only postion diverter element 20 in proper normal position, but their respective seals isolate the housing into two flow chambers 15a and 15b and substantially prevent fluid leakage or bypass around the exterior of the wall 21 of element 20.

A further block-like stop member 43 may be mounted on plate 11, spaced from stop 37, for engagement by rib 35 to properly position diverter element 20 for reversing flow. See FIGS. 3 and 4.

As can be seen from FIG. 3, when diverter element 20 is in its normal position, fluid flows in through supply port 16, through chamber 15a and passage 23 and out port 18 in a generally straight line. Return fluid flows in through port 19, through chamber 15b and passage 24 and out return port 17, parallel to but reversed from the supply flow.

By permitting some of the fluid to flow through passages 23 and 24, adjacent ports 16, 17 and 18, 19 can be positioned closer together than was previously possible, thus providing for a smaller valve with equal capacity.

Referring to FIG. 4, when diverter element 20 is in its reverse flow position, fluid flows in through supply port 16, through chamber 15 and around diverter element 20, and discharges through port 19. Return fluid flows in through port 18, through both passages 23 and 24 of diverter element 20, and discharges through return port 17.

As discussed above, the previously known valve construction was subject to problems of undesirable bypassing of fluid between the end edges of diverter element 20 and baffle 22 and the inner surface of valve wall 10, as well as binding at the interface between the said end edges and valve wall during rotative repositioning of element 20.

To solve this particular problem, seats 44 and 45 are mounted to the inner surface of cylindrical wall 10 between respective ports 16, 17 and 18, 19 and are intersected by the central longitudinal plane 46 containing baffle 22 when diverter element 20 is in its normal position. Seats 44, 45 extend in one direction circumferentially toward and surround the respective diagonally opposed ports 17 and 18. See FIG. 6 as to seat 44. The seats extend in the other direction circumferentially beyond plane 46 and terminate as at 47 and 48, on the side of the plane remote from respective ports 17 and 18.

Seats 44 and 45 are provided with respective concave faces 49 and 50 which, in section, are inclined planularly at an acute angle (such as 5° for example) to axis 25 and the inner cylindrical surface of wall 10.

The circumferential end edges 51 of tubular diverter element 20, as well as the end edges 52 of baffle 22 are provided with a planular slant which corresponds in degree and position to the angle of incline of faces 49 and 50. Thus, the element 20 and faces 49, 50 will engage, in section, at a planular interface.

When diverter element 20 is in its normal position, as shown in FIG. 3, leakage or bypass between the supply and return fluid flows is reduced by engagement of baffle end edges 52 with seat surfaces 49 and 50 adjacent the intersection with plane 46. Circumferential end edges 51 of diverter element 20 do seat against portions of seat surfaces 49 and 50 but do not contribute essentially to the bypass reducing function. Note that end edges are freely exposed to ports 16 and 18.

When diverter element 20 is in its secondary rotated position, as in FIG. 4, leakage or bypass between the supply and return fluid flows is reduced by engagement of diverter element end edges 51 with the portions of seat surfaces 49 and 50 in the areas surrounding respective ports 18 and 17. In this instance, baffle end edges 52 are freely exposed to these ports.

Means are provided to selectively shift diverter element 20 on its axis 25 to either firmly tighten end edges 51 and 52 onto seats 44 and 45 to thereby substantially eliminate bypass of fluid, as previously described, or to lift edges 51 and 52 from their seats so that diverter element 20 can be rotated between normal and reverse flow position without binding.

For this purpose, and in the present embodiment, pinion 30 forms part of a hollow housing 53, one end of which slidingly receives a hex-shaped end 54 of stub shaft 27. A threaded shaft 55 extends axially through housing 53 with its inner end threaded into end 54. A retainer 56 is fixedly secured to the outer end of housing 53, as by bolts 57, and serves to capture an adjusting nut 58 through which shaft 55 is threaded. A lock nut 59 is also threaded on shaft 55 and serves to tighten or loosen nut 58.

When it is desired to firmly tighten diverter element 20 and baffle edges 52 onto seats 44 and 45, lock nut 59 is manually or otherwise loosened and adjusting nut 58 is turned, causing threaded shaft 55 to move inwardly on its axis, this being axis 25, shifting diverter element 20 so that baffle edges 52 are tighteningly seated, as in FIG. 5.

When it is desired to shift diverter element 20 from normal to reverse flow position, which is about a 35° turn, lock nut 59 is loosened so that adjusting nut 58 can be turned on shaft 55 to lift element 20 away from seats 44 and 45, as shown in exaggerated form in FIG. 9. Element 20 will then be free to turn to its flow reversing position without binding, as shown in exaggerated form in FIG. 10. In that reverse flow position, diverter element 20 can be lowered so that its edges 51 engage seats 44 and 45 if desired. However, in the contemplated use for shuttle brush cleaning of condenser tubing, some bypassing of fluid flow between supply and return during reverse flow can be tolerated. This is due to the fact that brush cleaning may be used for only about two minutes out of six hours of total operation, and even with fluid bypassing occurring, there will be sufficient pressure to drive the brushes.

Slight loosening of element 20 from its seats 44 and 45 can also be accomplished while leaving element 20 in its normal position, if a slight tolerance adjustment is desired.

During axial shifting of the normally positioned element 20, ribs 35 and 36 will merely slide along resilient seals 39 and 42 to maintain the longitudinal seal, even while fluid is flowing through the valve.

Various modes of carrying out the invention are contemplated as being within the scope of the following claims particularly pointing out and distinctly claiming the subject matter which is regarded as the invention.

I claim:

1. In a diverter valve for connection between a source of pressurized fluid and a process device, with said valve having:
    (a) an enclosed housing having a generally cylindrical wall (10) closed by ends walls (11, 13) to form a cylindrical valve chamber (15),
    (b) a pair of spaced adjacent upstream ports (16, 17) and a pair of downstream ports (18, 19) with each upstream port being in-line with said downstream port,
    (c) an elongated longitudinal hollow tubular fluid flow diverter element (20) disposed within said housing and with said diverter element including a generally diametrical baffle (22) therewithin which forms a pair of separate parallel fluid flow passages (23, 24), said diverter element and baffle being of a length approximating the diameter of said cylindrical wall and having end edges (51, 52),
    (d) diametrically opposed longitudinally extending opposed rib means (35, 36) disposed on the outer surface of said diverter element and in-line and coextensive with said baffle,
    (e) means (26, 27) mounting said diverter element for rotation between two operative positions about a transverse axis (25) coinciding with the center axis of said cylindrical wall,
    (f) the first of said operative positions (FIG. 3) providing for two reversed generally parallel straight-through supply and return fluid flows between in-line upstream and downstream ports and through said chamber and said fluid flow passages within said diverter element,
    (g) the second of said operative positions (FIG. 4) providing for two reversed crossing supply and return fluid flows between diagonally opposed ports, with one flow passing through said chamber and the other flow passing through said pair of passages in said diverter element,
    (h) selectively actuatable means (30–34) for rotating said diverter element on said transverse axis between said first and second operative positions,
    (i) and stop means (37–40) cooperating with said rib means when said diverter element is at said first operative position
        (1) for positioning said diverter element
        (2) and for separating said valve chamber into two isolated portions (15a, 15b), (j) the improvement comprising cooperative means disposed (44, 45) on the interior of said cylindrical wall (10) and disposed on said end edges (51, 52) of said diverter element (20) for reducing of bypassing fluid flow within said valve, said cooperative means on the interior of said cylindrical wall comprising:
 (1) seats (44, 45) mounted to said wall between said upstream and downstream ports and intersected by a central longitudinal plane (46) containing said baffle (22) when said element (20) is in its said first operative position,
 (2) said seats extending in one direction circumferentially toward and surrounding a pair of diagonally opposed ports (18, 17) of said upstream and downstream ports, and extending in the other direction circumferentially and terminating (47, 48) on the side of said plane remote from said diagonally opposed ports,
 (3) said seats having concave faces (49, 50) which, in section, are inclined planularly at an acute angle to said transverse axis and the inner surface of said cylindrical wall.

2. The valve of claim 1 in which said cooperative means on the end edges of said diverter element includes:
 (a) a planular slant on the said end edges (52) of said baffle (22) which corresponds in degree and position to the inclined acute angle of said seat faces (49, 50),
 (b) said baffle edges normally engaging said seats in said central longitudinal plane (46) when said diverter element is in its said first operative position.

3. The valve of claim 1 or 2 in which said cooperative means on the ends of said diverter element includes:
 (a) a planular slant on the said end edges (51) of said diverter element which corresponds in degree and position to the inclined acute angle of said seat faces (49, 50),
 (b) said diverter element and last-named end edges being disposed in surrounding relationship to said diagonally opposed ports (18, 17) when said diverter element is in its second operative position.

4. The valve of claim 3 which includes the further improvement of means (53–59) for selectively shifting said diverter element along its transverse axis of rotation so that its end edges (51, 52) are moved either inwardly into tight engagement with said seats (44, 45) or moved outwardly out of engagement with said seats for subsequent free arcuate movement upon rotation of said diverter element by said rotating means.

5. The valve of claim 1 or 2 which includes the further improvement of resilient seal means (39, 42) disposed between said rib means (35, 36) and said stop means (37, 40) when said diverter element is in its first operative position for reducing bypassing of fluid flow around the exterior of said diverter element between said isolated portions (15a, 15b) of said valve chamber.

6. The valve of claim 4 which includes the further improvement of:
 (a) a resilient seal (39, 42) disposed on said stop means (37, 40) and engaged by said rib means (35, 36) when said diverter element is in its first operative position and in engagement with said seats (44, 45),
 (b) said seal forming means for reducing bypassing of fluid flow around the exterior of said diverter element between said isolated portions (15a, 15b) of said valve chamber,
 (c) the construction being such that actuation of said shifting means (53–59) causes said rib means to slide on said seal means, while maintaining the seal therebetween.

7. The valve of claim 4 which includes the further improvement of:
 (a) resilient seal means (39, 42) for providing a seal between said stop means (37, 40) and said rib means (35, 36) when said diverter element (20) is in its first operative position (FIG. 3),
 (b) said seal means forming means for reducing bypassing of fluid flow around the exterior of said diverter element between said isolated portions (15a, 15b) of said valve chamber.

* * * * *